Patented Aug. 19, 1952

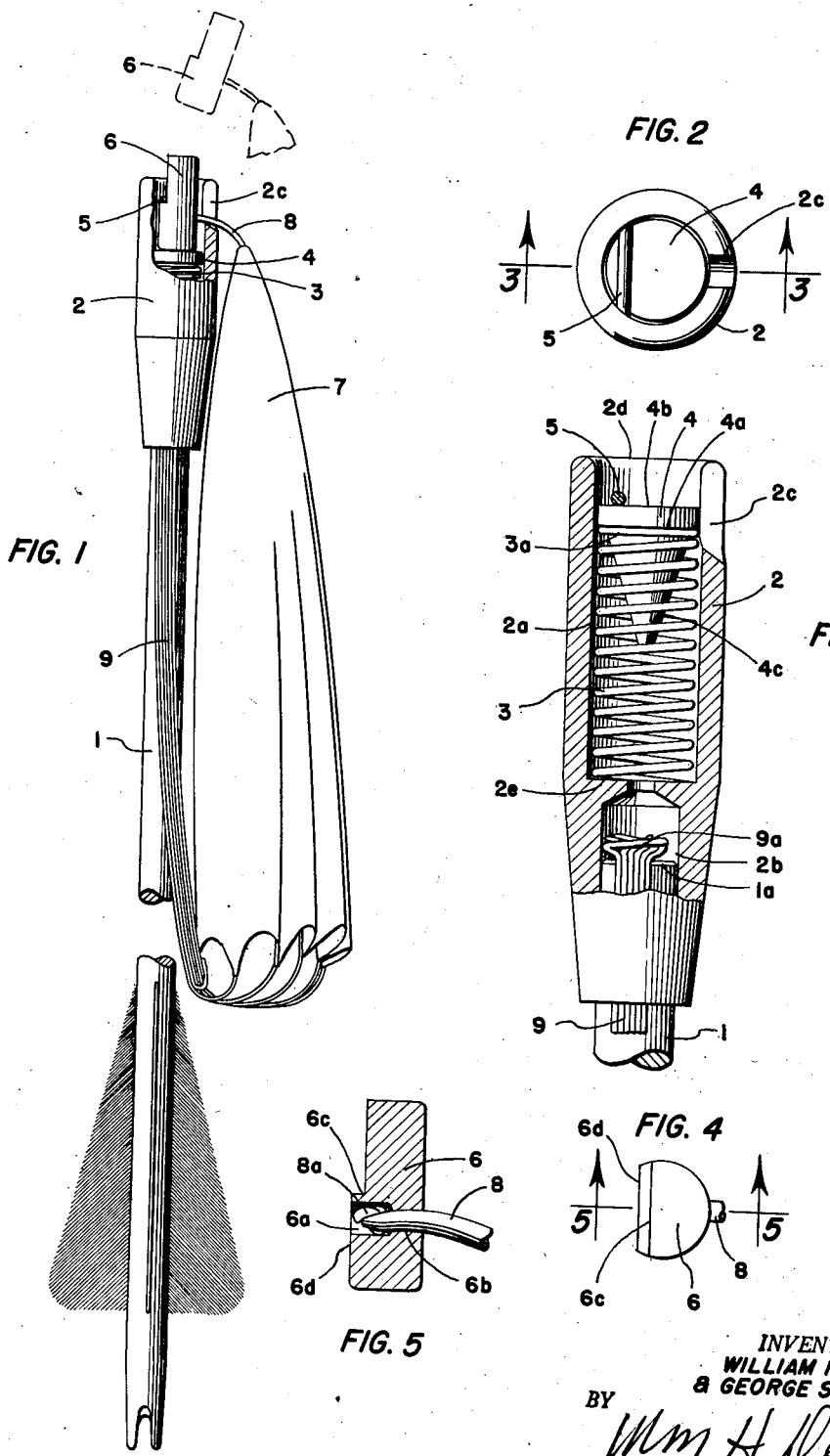

2,607,159

UNITED STATES PATENT OFFICE 2,607,159

PARACHUTE RELEASE

William H. Hunt, National City, and George S. Smith, Bakersfield, Calif., assignors of one-third to Isabella Smith, San Diego, Calif.

Application April 30, 1947, Serial No. 745,068

7 Claims. (Cl. 46—86)

Our invention relates to a parachute release, more particularly for use in connection with projectiles or the like for lowering said projectiles after having been projected into the air and the objects of our invention are:

First, to provide a parachute release of this class which may be secured to the head of a projectile for automatically releasing a parachute when the projectile has lost its upward movement and is at the top of its substantially vertical flight;

Second, to provide a parachute release of this class in which a parachute may be connected to the head of a projectile whereby the middle of the parachute is foremost and the shroud lines thereof extend forwardly from the rear of the parachute in connection with the head of said projectile so that drag in connection with said parachute when passing through the air controls the release of said parachute permitting the same to be released at its middle portion when the projectile slows down to a certain speed;

Third, to provide a parachute release of this class which is very small and compact in proportion to its utility;

Fourth, to provide a parachute release of this class in which an ejecting spring is used to release the middle portion of the parachute from the head of a projectile when its forward speed is decreased to a certain degree;

Fifth, to provide a parachute release of this class having a minimum amount of mechanism in connection with the center of the parachute for releasing the same; and Sixth, to provide a parachute release of this class which is very simple and economical of construction, efficient in operation and which will not readily deteriorate or get out of order.

With these and other objects in view, as will appear hereinafter, our invention consists of certain novel features of construction, combination and arrangement of parts and portions as will be hereinafter described in detail and particularly set forth in the appended claims, reference being had to the accompanying drawing and to the characters of reference thereon forming a part of this application in which:

Fig. 1 is a side elevational view of our parachute release showing portions thereof broken away and in section and showing the same in connection with an arrow shaft illustrated fragmentarily; Fig. 2 is a forward end view of our parachute release showing the latch member thereof removed and showing said parachute release on enlarged scale; Fig. 3 is a side elevational view of our parachute release showing the latch member thereof removed and showing portions broken away and in section to amplify the illustration illustrated on a larger scale than that as shown in Fig. 1 of the drawing; Fig. 4 is an end view of the latch member of our parachute release and Fig. 5 is a longitudinal sectional view thereof shown on enlarged scale.

Similar characters of reference refer to similar parts and portions throughout the several views of the drawing.

The shaft 1, release casing 2, spring 3, plunger 4, pin 5, latch member 6, parachute 7, cord 8 and the shroud lines 9 constitute the principal parts and portions of our parachute release.

As shown in Fig. 3 of the drawing, the release casing 2 is provided with a bore portion 2b therein in which the forward end 1a of the shaft 1 is snugly fitted. The forward ends 9a of the shroud lines 9 are wedged into the bore portion 2b at one side of the shaft 1 maintaining the same securely fixed relatively to the forward end 1a of the shaft 1. The opposite end of the release casing 2 is provided with an open portion 2d communicating with the bore 2a therein having a shelf 2e intermediate said bore portion 2a and said bore portion 2b against which the spring 3 is engaged. The spring 3 at its opposite end 3a engages the shoulder portion 4a of the plunger 4 which is provided with a flat forward surface 4b and a conical portion 4c extending into the spring 3, all as shown best in Fig. 3 of the drawing. Extending laterally through the release casing 2 above the plunger 4 is the detent pin 5 which limits the longitudinal movement of the plunger 4 urged by compression of the spring 3. Communicating with the open end 2d of the release casing 2 is the slotted portion 2c arranged to receive the cord 8 extending therethrough, as shown in Fig. 1 of the drawing, which is connected to the middle of the parachute 7 at its one end and fixed in connection with the latch member 6 at its opposite end. As shown in Fig. 5 of the drawing, the latch member 6 is provided with a bore portion 6a in one side thereof communicating with a reduced bore portion 6b extending through the opposite side thereof. The end of the cord 8 is provided with a knot 8a in the enlarged bore portion 6a which fixes said cord 8 in the latch member 6. This latch member 6 is provided with a flat detent ledge portion 6c arranged to engage the detent pin 5 in the upper end of the release casing 2, all is shown best in Figs. 1 and 2 of the drawing.

The operation of our parachute release is substantially as follows:

When the casing 2 is connected to the forward portion of a projectile, such as the arrow 1, or any other conventional projectile, the detent ledge portion 6c of the latch 6 is engaged with the detent pin 5, as shown in Fig. 1 of the drawing, for holding the latch 6 in the casing 2 and the middle of the parachute 7 is connected to the latch member 6 in the end of the release casing 2, the projectile is shot into the air having the release casing 2 foremost whereupon aerodynamic drag on the parachute 7 forces the detent ledge portion 6c away from the detent pin 5 laterally of the axis of the casing 2 and holds the spring 3 under compression by means of the cord 8 which is maintained in tension tending to force the latch member 6 downwardly against the plunger 4 and when the speed of the projectile or arrow 1 decreases to a certain speed, the drag on the parachute 7 is less than the compressive force of the spring 3 which causes the latch member 6 to be ejected from the open end 2d of the release casing 2 whereupon descent of the projectile 1 is accomplished in slow precise manner by support of the parachute 7 which opens when the latch member 6 is released from the release casing 2. The pin 5 prevents the plunger 4 from being displaced from the release casing 2 and the slotted portion 2c in the release casing 2 conveniently accommodates the cord 8 in its rearwardly extending position in connection with the middle portion of the parachute 7.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a parachute release of the class described the combination of, a projectile, a release casing secured to the foremost end of said projectile and provided with a bore portion at the foremost end thereof, said casing having a slotted portion in its side wall extending from its forward end communicating with said bore and the outer side thereof, a spring in said casing tending to move toward the open end of said casing, detent means for limiting the movement of said spring, a latch engageable with said detent means positioned in the open end of said casing within said bore portion tending to compress said spring, a cord in connection with said latch extending through said slotted portion, a parachute having its middle portion connected to said cord and shroud lines connected with said parachute and said release casing said latch adapted to move laterally in said casing for disengagement from said detent means, said spring tending to force said latch toward said detent means.

2. In a parachute release of the class described the combination of, a projectile, a release casing secured to the foremost end of said projectile and provided with a bore portion at the foremost end thereof, said casing having a slotted portion in its side wall extending from its forward end communicating with said bore and the outer side thereof, a spring in said casing tending to move toward the open end of said casing, detent means for limiting the movement of said spring, a latch engageable with said detent means positioned in the open end of said casing within said bore portion tending to compress said spring, a cord in connection with said latch extending through said slotted portion, a parachute having its middle portion connected to said cord, shroud lines connected with said parachute and said release casing said latch adapted to move laterally in said casing for disengagement from said detent means, said spring tending to force said latch toward said detent means and a plunger in connection with said spring adapted to bear on the inner end of said latch member.

3. In a parachute release of the class described the combination of, a projectile, a release casing secured to the foremost end of said projectile and provided with a bore portion at the foremost end thereof, said casing having a slotted portion in its side wall extending from its forward end communicating with said bore and the outer side thereof, a spring in said casing tending to move toward the open end of said casing, detent means for limiting the movement of said spring, a latch engageable with said detent means positioned in the open end of said casing within said bore portion tending to compress said spring, a cord in connection with said latch extending through said slotted portion, a parachute having its middle portion connected to said cord, shroud lines connected with said parachute and said release casing said latch adapted to move laterally in said casing for disengagement from said detent means, said spring tending to force said latch toward said detent means, a plunger in connection with said spring bearing on the inner end of said latch member and said detent means comprising a pin extending through said casing arranged to limit the movement of said plunger, said latch member having a flat portion adapted to be positioned adjacent said pin for maintaining said cord in alignment with said slotted portion.

4. In a parachute release of the class described, the combination with the forward end of a projectile of a cylindrical casing having a bore open at its forward end, resilient means in said casing tending to pass toward the forward open end of said casing, a latch member positioned in the forward end of said casing laterally movable therein and engageable with said resilient means, a cord connected with said latch member extending rearwardly of the forward end of said casting, a parachute having its middle portion connected to said cord and shroud lines connected with the periphery of said parachute and connected with said casing at their opposite ends detent means in said casing engageable and disengageable by said latch with lateral movement of said latch in said casing, said resilient means tending to force said latch toward said detent means.

5. In a parachute release of the class described, the combination with the forward end of a projectile of a cylindrical casing having a bore open at its forward end, resilient means in said casing tending to pass toward the forward open end of said casing, a latch member positioned in the forward end of said casing laterally movable therein and engageable with said resilient means, a cord connected with said latch member extending rearwardly of the forward end of said casing, a parachute having its middle portion connected to said cord and shroud lines connected with the periphery of said parachute and connected with said casing at their opposite ends detent means in said casing engageable and disengageable by said latch with lateral movement of said latch in said casing, said resilient means tending to force said latch toward said detent means, said casing having a slotted portion in its side wall communicating with the open end thereof guiding said cord intermediate said latch member and the middle of said parachute.

6. In a parachute release of the class described, the combination with the forward end of a projectile of a cylindrical casing having a bore open at its forward end, resilient means in said casing tending to pass toward the forward open end of said casing, a latch member positioned in the forward end of said casing laterally movable therein and engageable with said resilient means, a cord in connection with said latch member extending rearwardly of the forward end of said casing, a parachute having its middle portion connected to said cord, shroud lines connected with the periphery of said parachute and connected with said casing at their opposite ends, said casing having a slotted portion in its side wall communicating with the open end thereof guiding said cord intermediate said latch member and the middle of said parachute, said latch member having a detent ledge portion at one side thereof and a pin extending through said casing parallel to said detent ledge portion engageable with the same and arranged to limit the upward movement of said resilient means in said casing said latch member laterally movable and disengageable from said detent pin.

7. In a parachute release of the class described, the combination with the forward end of a projectile of a cylindrical casing having a bore open at its forward end, resilient means in said casing tending to pass toward the forward open end of said casing, a latch member positioned in the forward end of said casing laterally movable therein and engageable with said resilient means, a cord in connection with said latch member extending rearwardly of the forward end of said casing, a parachute having its middle portion connected to said cord, shroud lines connected with the periphery of said parachute at one end and connected with said casing at their opposite ends, said casing having a slotted portion in its side wall communicating with the open end thereof guiding said cord intermediate said latch member and the middle of said parachute, said latch member having a detent ledge portion at one side thereof and a pin extending through said casing parallel to said detent ledge portion engageable with the same and arranged to limit the upward movement of said resilient means in said casing said latch member laterally movable and disengageable from said pin, said resilient means including a coil spring and a plunger at the outer end thereof engageable with said latch member.

WILLIAM H. HUNT.
GEORGE S. SMITH.

REFERENCES CITED

The following references are of record in the file of this patent:

UNITED STATES PATENTS

| Number | Name | Date |
| --- | --- | --- |
| 442,464 | Smith | Dec. 9, 1890 |
| 1,079,200 | Wilde | Nov. 18, 1913 |
| 1,635,223 | Rost | July 12, 1927 |
| 1,845,613 | Marx | Feb. 16, 1932 |
| 1,890,759 | Vogt | Dec. 13, 1932 |
| 2,559,458 | Orr | July 3, 1951 |